(12) United States Patent
Briscoe

(10) Patent No.: US 12,091,338 B2
(45) Date of Patent: Sep. 17, 2024

(54) COMPOSITION FOR pH CONTROL

(71) Applicant: WaterCo Ltd, Rydalmere (AU)

(72) Inventor: Nick Briscoe, Rydalmere (AU)

(73) Assignee: Waterco Ltd., Rydalmere (AU)

( * ) Notice: Subject to any disclaimer, the term of this patent is extended or adjusted under 35 U.S.C. 154(b) by 96 days.

(21) Appl. No.: 17/400,007

(22) Filed: Aug. 11, 2021

(65) Prior Publication Data

US 2023/0047032 A1     Feb. 16, 2023

(51) Int. Cl.
*C02F 1/66* (2023.01)
*C02F 103/42* (2006.01)

(52) U.S. Cl.
CPC ............ *C02F 1/66* (2013.01); *C02F 2103/42* (2013.01); *C02F 2209/06* (2013.01); *C02F 2303/20* (2013.01)

(58) Field of Classification Search
None
See application file for complete search history.

(56) References Cited

U.S. PATENT DOCUMENTS

2007/0181510 A1* 8/2007 Harvey ................... C02F 1/722
                                                        210/764
2022/0402789 A1* 12/2022 Marchand ................ C02F 1/66

* cited by examiner

*Primary Examiner* — Peter Keyworth
(74) *Attorney, Agent, or Firm* — TraskBritt

(57) ABSTRACT

A composition for treating swimming pool water comprises sodium bisulphate and aluminium sulphate. The aluminium sulphate in the composition minimizes the precipitation of sodium bisulphate at temperatures lower than about 5 degrees Celsius for a time period to maintain a concentrated form of acid to control the pH level of the water. In some embodiments, the composition includes 30 to 40% sodium bisulphate ($NaHSO_4$) wt/wt %, 0.2% to 5% aluminium sulphate $Al_2(SO_4)_3$ wt/wt %, 0.1% to 1% copper sulphate/chelating agent wt/wt %, 0.01% to 0.02% sodium hydroxide, and balance water.

20 Claims, No Drawings

COMPOSITION FOR pH CONTROL

TECHNICAL FIELD

The present invention relates to controlling chemical conditions in water and, more particularly, to compositions for controlling chemical conditions such as pH in a large volume of water, such as water in a swimming pool.

BACKGROUND

Bodies of water such as swimming pools typically require the addition of chemical compositions to maintain acceptable sanitary and operational conditions. Due to wide availability and relatively low cost, chlorine is used extensively for the deactivation of pathogens in drinking water, swimming pool water and wastewater. As chlorine is consumed by pathogens and contamination of the water, chlorine must be regularly added to the water to maintain acceptable sanitary conditions.

The effectiveness of chlorine in killing pathogens is dependent upon the pH of the water. Chlorine is less stable as the pH is lowered. In order to maintain an effective level of chlorine in the pool for killing pathogens, chlorine is replenished by chlorination of the pool water. Chlorination of water is typically achieved by the addition of chlorine as hypochlorite powder, either using a solution containing sodium hypochlorite or as granular calcium hypochlorite. As both of these compounds are alkaline or basic in nature, the pH of the water will increase upon addition of the hypochlorite.

It is well known that chlorine is significantly less effective against pathogens as pH increases because hypochlorite becomes the dominant species. As the pH is lowered to a more acidic value, the hypochlorous acid species dominates. Hypochlorous acid is 100 times more effective against pathogens than hypochlorite. In order to prevent hypochlorite formation, the pH of the water is regulated from 7.2-7.6 to aid in the presence of hypochlorous acid. (see "Handbook of Chlorination" by C. White, Van Nostrand Reinhold, New York, N.Y.). This is often done by the addition of muriatic acid, otherwise known as hydrochloric acid, a very strong acid available in liquid form.

The swimming pool industry has seen very little innovation with chemicals that control the pH level within a swimming pool. As noted above, almost all pools require pH adjustment in the downwards direction to improve the effectiveness of pathogen removal in the water. Common chemicals used to lower the pH in a swimming pool are hydrochloric acid and sulphuric acid. Less common is a powder form of sulphuric acid known as sodium bisulphate (dry acid). Still less common is the use of $CO_2$ gas. Whilst this is a safer way to control pH, the cost of equipment and supply issues of the gas in some areas has seen a low uptake of this form of control.

Hydrochloric acid (HCl) is a very strong acid that expels hazardous fumes. The fumes cause corrosion to structures when used indoors. This form of acid is also extremely harsh on chemical dosing equipment and generally leads to breakdowns even when the acid is diluted.

Sulphuric acid ($H_2SO_4$) is generally less corrosive to indoor structures. However, sulphuric acid can cause serious burns to the skin and is a more hazardous material at higher strengths than the alternatives. In some regions, sulphuric acid is not permitted to be used for pH control for swimming pools due to the significant safety risk. Sulphuric acid is generally recommended for fibreglass pools. As noted in the Pool Water Treatment Advisory Group Technical Note for Sulphuric Acid: "When mixed with water, concentrated sulphuric acid has a vigorous exothermic reaction (i.e., producing heat) and produces significant fumes. It can be fatal if ingested and causes serious burns on contact with the skin. If it is used, it should not be as concentrated acid, but diluted to perhaps 25% or lower by the supplier. Personal protection equipment should be worn when handling it. Like hydrochloric acid and sodium bisulphate, it will produce chlorine gas when mixed with hypochlorites. Another by-product is sulphates, so additional dilution of the pool water may be required to maintain the sulphate concentration below 360 mg/l to preserve the integrity of the pool fabric." (https://www.pwtag.org/sulphuric-acid-january-2011/).

Sodium Bisulphate ($NaHSO_4$) is generally used as a powder. The inconvenience of having to mix the powder into a solution prior to use has been seen as a barrier for wide application. Although this form of acid is far safer to use, as it does not form corrosive fumes and is far more suitable to use in chemical dosing systems, the convenience factor has resulted in limited use in swimming pools to date.

All forms of acid that are currently for sale for use in swimming pools have a singular function—to lower the pH level in a swimming pool.

In addition to pH control, many pool operators require additional chemicals to control various issues that commonly arise while operating a swimming pool. These include clarity issues with the water, excessive phosphates levels and algae formation. In order to provide a safe and comfortable swimming experience, not only it is critical that all pathogens are removed from the water but the turbidity, colour, odour and taste of the water must be comfortable for the users. Maintaining multiple chemical properties of swimming pool water on a continuous basis can require the application of multiple chemicals in a complicated dosing regimen. Continuous filtration and disinfection of swimming pool water removes pathogens, which keeps the water safe to swim in, but this does not treat all aspects of swimming pool water. Water clarity, phosphate removal and algae control are other significant aspects of swimming pool water treatment that need to be monitored and controlled on a continuous basis.

A need exists for a swimming pool water treatment composition that can maintain control of the pH of the swimming pool water to support the removal of pathogens at an appropriate pH level as well as allowing for treatment of multiple swimming pool water issues such as water clarity, phosphate removal and algae control in a single application.

Any discussion of the prior art throughout the specification should in no way be considered as an admission that such prior art is widely known or forms part of common general knowledge in the field.

BRIEF SUMMARY

Problems to be Solved

It is an aim and objective of the present invention to provide a single chemical composition that that will safely maintain the pH of swimming pool at an appropriate level water to support the removal of pathogens from the water and will also allow for treatment of multiple swimming pool water issues such as water clarity, phosphate removal, and algae control in a single application.

It is an object of the present invention to overcome or ameliorate at least one of the disadvantages of the prior art, or to provide a useful alternative.

Means for Solving the Problem

According to a first aspect, the invention provides a composition for treating swimming pool water, the composition comprising:
sodium bisulphate; and
aluminium sulphate
wherein the aluminium sulphate in the composition minimises the precipitation of sodium bisulphate at temperatures lower than about 5 degrees Celsius for a time period to maintain a concentrated form of acid to control the pH level of the water.

The time period is preferably more than about 8 hours.

Preferably, the temperature is lower than about 3 degrees Celsius.

In a preferred embodiment, the ratio of aluminium sulphate to sodium bisulphate in the composition is between about 1/10 and 1/500 wt/wt %. In a particularly preferred embodiment, the ratio of aluminium sulphate to sodium bisulphate in the composition is between about 1/20 and 1/100 wt/wt %. In a particularly preferred embodiment, the ratio of aluminium sulphate to sodium bisulphate in the composition is between about 1/90 and 1/100 wt/wt %.

The concentration of acid may be maintained to control the pH level of the water to between about 7.2 to about 7.6.

In a preferred embodiment, the composition further comprises copper sulphate.

The ratio of copper sulphate to sodium bisulphate is preferably between about 1/200 to 1/500 wt/wt %.

A particularly preferred composition comprises a chelating agent in combination with copper sulphate, wherein the ratio of copper sulphate/chelating agent to sodium bisulphate is between about 1/200 to 1/500 wt/wt %. A further particularly preferred composition comprises sodium hydroxide as a calcium scale inhibitor, wherein sodium hydroxide is present in the composition in a range of 0.01% to 0.02% by weight.

According to a second aspect, the invention provides a composition for treating swimming pool water, the composition comprising:
30 to 40% sodium bisulphate ($NaHSO_4$) wt/wt %;
0.2% to 5% aluminium sulphate $Al_2(504)_3$ wt/wt %;
0.1% to 1% copper sulphate/chelating agent wt/wt %;
0.01% to 0.02% sodium hydroxide; and
balance water.

The composition preferably controls the pH of swimming pool water.

In a particularly preferred embodiment, the composition is used for additionally lowering phosphate levels, improving water clarity or controlling algae in swimming pool water.

Another aspect provides use of a composition according to the invention for treating water in a swimming pool or spa. Preferred use of a composition according to the invention is additionally for controlling the pH, lowering phosphate levels, improving water clarity or controlling algae in water in a swimming pool or spa.

Perox pH Control™ is a particularly preferred embodiment of the invention and is a formulation of various chemicals that will lower the pH of swimming pool water but also performs additional functions within the swimming pool.

Perox pH Control™ is also suitable for use in a chemical dosing pump as it is far less corrosive on pump parts that are in contact with acid relative to common acids used in swimming pool water treatment.

The additional functions that Perox pH Control™ will perform in a swimming pool include:
1) Actively remove phosphates at a slow rate (when dosed at a rate that will regulate the pH) which does not impact on water quality. Generally, most phosphate removers used in a swimming pool will result in acceptable levels of water turbidity for up to 10 days. Perox pH Control™ will perform the task of removal of phosphates without any interruption to the use of the pool.
2) Water Clarity—Perox pH Control™ contains a flocculant that will actively assists in ensuring more particulate is trapped in the filter. This will result in improved water clarity as the filter is able to capture finer particles that would otherwise pass through the filter.
3) Algae control is generally managed by sanitisers in a swimming pool. It has been shown that the addition of copper can act as an anti-microbial within the water and assist the sanitiser in elimination and prevention of algae outbreaks. However, copper can precipitate out onto the surface of the pool. Perox pH Control™ has a copper sulphate additive combined with a chelating agent to prevent copper precipitation onto the surface of the pool. In addition to this, it is common for a high pH to contribute to the precipitation of copper on pool surfaces. As the copper is contained within an acidic solution, it is less likely to form precipitate when added to the pool water.
4) Reduce scale formation within the pool structure and remove existing scale. Scale formation can be a severe problem in swimming pools with a negative edge where the water overflows into an auxiliary balance tank to create an illusion of an infinity edge on the pool. The overflow edge is generally timed from the overflow edge to the water located in the balance tank. In this situation, scale build-up is a common and unsightly issue. The scale build-up is also typical on waterline tiles and can form in some internal finishes of the pool, causing unsightly calcium spots to protrude from the surface. Perox pH Control™ contains a calcium scale inhibitor in the form of a solution of sodium hydroxide to minimise this problem.

Chelating agents that are suitable for use in the composition of the invention are typically based on ethanol amines (ETA).

In the context of the present invention, the words "comprise," "comprising" and the like are to be construed in their inclusive, as opposed to their exclusive, sense, which is in the sense of "including, but not limited to."

The invention is to be interpreted with reference to the at least one of the technical problems described or affiliated with the background art. The present aims to solve or ameliorate at least one of the technical problems and this may result in one or more advantageous effects as defined by this specification and described in detail with reference to the preferred embodiments of the present invention.

DETAILED DESCRIPTION

Preferred embodiments of the invention will now be described with reference to the accompanying non-limiting examples.

A preferred embodiment of the invention is Perox pH Control™ which is a combination of sodium bisulphate, aluminium sulphate, copper sulphate and chelating agent mixed into a solution.

Sodium bisulphate (NaHSO$_4$) is a significantly safer option for pool pH control than either sulphuric or hydrochloric (muriatic) acid. Sodium bisulphate is not dangerous to handle, whilst hydrochloric acid in its liquid form requires the use of acid-proof gloves, boots, and facial masks. However, sodium bisulphate is typically available in a solid powder form and this has convenience and handling problems also.

Sodium bisulphate is safe for the environment and is biodegradable. The US Food & Drug Administration has labelled sodium bisulphate as safe for humans and it is not classified as a hazardous material under DOT/OSHA. It has also been approved for use by the authorities of Mexico, Canada, New Zealand, Australia, and the EU.

Aluminium sulphate is Al$_2$(SO$_4$)$_3$ is soluble in water and is mainly used as a coagulating agent (promoting particle collision by neutralizing charge) and clarifying agent in the purification of drinking water and wastewater treatment plants, and also in paper manufacturing.

The problem that needed to be overcome when formulating this product was to avoid precipitation of sodium bisulphate at low temperatures (lower than 3 degrees Celsius for more than 8 hours) whilst still maintaining sufficiently concentrated form of acid that would control the pH level in a pool without excessive use.

While normally used as a coagulating and clarifying agent, the addition of aluminium sulphate to the formula in this case was surprisingly found to enable a higher concentration of sodium bisulphate to be achieved without the formation of precipitation when subjected to low temperatures for an extended period of time.

The inclusion of copper sulphate and a chelating agent in Perox pH Control™ was surprisingly found to assist with the anti-microbial treatment of the water without the copper precipitating out of solution, and was also found not to interfere with the precipitation of the sodium bisulphate at lower temperatures.

It was also surprisingly found that a calcium scale inhibitor could be successfully included in the formulation in low concentrations to further increase the advantages of the product. A solution of a low concentration of sodium hydroxide was added to the product and was found to reduce scale formation within the pool structure and also remove existing scale. Further advantages of including the calcium scale inhibitor have been surprisingly found to include prevention of rust discolouration and staining, scum formation and plugging of filters; and prevention of corrosion of metal parts in the pool environment, including filters and recirculating equipment. Further advantageous benefits have been found to include maintaining the integrity of the concrete shells, maintaining the integrity of grout when used between tiles.

Another significant benefit of including a calcium scale inhibitor in the product in low concentrations was modification of the crystal growth of calcium carbonate. Damage to the surface of concrete pools has been known to occur when sulphate levels in the pool water rise above 360 ppm. It is understood that this is because calcium carbonate can form in the microscopic pores of the concrete. Over time, the calcium carbonate crystals increase in size and begin to cause damage to the concrete structure as they expand out and crack the concrete. This action can also cause pool interior surfaces to lift from the concrete shell. It has been surprisingly found that low concentrations of a calcium scale inhibitor can minimise this problem in synergy with the other benefits of the Perox pH Control™ product.

The general process to formulate the Perox pH Control™ composition is as follows:
1. Add about 638 grams of water to beaker
2. Add 450 grams of NaHSO$_4$ gradually until completely dissolved
3. Add 60 grams of 8% aluminium solution=4.8 grams of solids
4. Add 2 grams of combined copper sulphate and chelating agent, preferably monoethanolamine (MEA)/diethanolamine blend at about a 5/95 w/w ratio.
5. Add about 212 Ml of water to bring to total volume of 1000 Ml Calcium scale inhibitor can be added in the form of 5-15% sodium hydroxide solution (Lo~Chlor Scale and Stain Defense™) (approx. 16 mls of 5-15% solution to 1000 mL of the above composition).

Final Results:
Total weight 1310 grams=SG 1.31 g/cm$^3$
Actual concentration of NaHSO$_4$ w/w 34.35%
pH of the concentrate minus −0.149 at 21° C.
pH of aluminium sulphate at 8% 2.7 at 20° C.
Use with Hydroxypure™ Chlorine Free System By simplifying technology associated with the advanced treatment of drinking water, Waterco has successfully applied it to the treatment of swimming pool water.

The end result is a chlorine free swimming pool, fully enriched with oxygen. This is fantastic news for those looking for a healthy alternative to chlorine. With no odours or taste, it is soft and gentle to the skin and no shower is needed after swimming.

Endorsed by the National Asthma Council of Australia and approved by its SENSITIVE CHOICE® program, Hydroxypure™ is an advanced breakthrough in swimming pool and spa sanitisation.

Hydroxypure™ sanitisation is based on Advanced Oxidation Processes (AOP), which combine Perox, a chlorine free sanitiser (H$_2$O$_2$) and hybrid ozone (O$_3$) to enhance the sanitisation process.

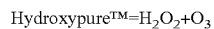

Hydroxypure™=H$_2$O$_2$+O$_3$

Advances Oxidation Processes (AOPs), in general terms, are a set of chemical treatment procedures designed to remove organic (and sometimes inorganic) materials in water and wastewater by oxidation through reactions with hydroxyl radicals (OH). In Hydroxypure™ applications, Advanced Oxidation Processes refer more specifically to a subset of such chemical processes that employ ozone (O$_3$) and hydrogen peroxide (H$_2$O$_2$) and/or UV light from the sun. The use of ozone and Perox™ in harmony increases active oxygen levels in the water. This synergy ensures the safety of the water environment without creating harmful chemical by-products. The end result is a swimming pool that is free of chlorine treatment and potentially harmful by-products and enriched with oxygen.

Advanced oxidation processes (AOPs) have been studied for the treatment of different wastewaters. During the AOP treatment of wastewater, hydroxyl radicals (OH) or sulphate radicals ($^-$SO$_4$) are generated in sufficient quantity to remove refractory organic matters, traceable organic contaminants, or certain inorganic pollutants, or to increase wastewater biodegradability as a pre-treatment prior to an ensuing biological treatment. Hydroxyl radicals disrupt the composition of those substances-causing them to break down. Hydroxyl radicals oxidize all kinds of organic contaminants in swimming pool water, including sweat, body oils, bacteria, viruses, human waste, and toxins such as pesticides. Further, after hydroxyl radicals oxidize organic and inorganic contaminants in the water, they quickly convert back to oxygen. No noxious by-products are produced or left behind.

Ozone-Based Advanced Oxidation Processes in the Hydroxypure™ System

Ozone ($O_3$) is a strong oxidant itself with an oxidation potential of 2.07 V vs. SCE. However, direct $O_3$ oxidation is a selective reaction, in which $O_3$ preferentially reacts with the ionized and dissociated form of organic compounds, rather than the neutral form. Under certain conditions, hydroxyl radical OH is produced from $O_3$ to initiate indiscriminate oxidation (indirect mechanisms). Different detailed mechanisms have been proposed to explain the complex OH generation, and the overall reaction involving OH generation is expressed below.

$$3O_3 + H_2O \rightarrow 2OH \cdot + 4O_2$$

In the presence of other oxidants or irradiation, the OH radical yield can be significantly improved. For example, in the peroxone ($O_3/H_2O_2$) system, the $O_3$ decomposition and OH radical production can be enhanced by hydroperoxide ($HO_2^-$) produced from $H_2O_2$ decomposition.

$$H_2O_2 \rightarrow HO_2^- + H^+$$

$$HO_2^- + O_3 \rightarrow OH \cdot + O_2^- + O_2$$

In the $O_3$/ultraviolet (UV) irradiation, $H_2O_2$ is generated as an additional oxidant primarily through $O_3$ photolysis.

$$O_3 + H_2O + h\nu \rightarrow H_2O_2 + O_2$$

Advanced oxidation processes (AOPs) can be used to provide swim-ready water without the harsh and dangerous effects of typical chlorine sanitizing treatments. AOPs can be used to safely neutralize a wide range of contaminants in swimming pool water, including some dangerous pathogens that traditional chlorine treatments cannot tackle.

Advanced Oxidation Processes can be used to tackle several bugs that can be chlorine resistant including Giardia, and *Cryptosporidium parvum* (aka "Crypto"). AOP technology destroys the cell walls of the "Crypto" bug to remove it. Sometimes even used in tandem with a small amount of chlorine, AOPs work by oxidizing both organic and inorganic contaminants in the swimming pool environments, The efficacy of Advanced Oxidation Processes comes without producing toxic by-products, such as chloramines, which can cause serious irritation for pool users. Chlorinated pools are well known to cause itchy eyes, dry skin, bleach-like odours, sore throats, and faded swimsuits. Some users may even experience nausea or vomiting. Unlike chlorine pool treatments, AOPs destroys chloramines, removing some of the unwanted effects they can cause.

Within the first 24 to 48 hours of using an Advanced Oxidation Process, hydroxyl radicals clean, sanitize, and micro-flocculate the water. The hydroxyl radicals work in seconds to oxidize contaminants, unlike chlorine which could take several hours.

Pool systems that use Advanced Oxidation Processes do not eliminate the need for chlorine and other chemicals. However, the requirement for these chemicals is dramatically reduced by the AOP systems. In addition, AOP helps boost the overall effectiveness of the small amount of chemicals that are used.

In addition, hydroxyl radicals from advanced oxidation processes can be used to prevent the formation of biofilm. Biofilm is an accumulation of bacterial colonies that grow on the tile line and any stone surface in a swimming pool.

Advanced Oxidation Process technology can also be used to improve water clarity by removing the colloids-tiny particles from dissolved metals, gels, lotions, and other inorganic substances—that make the water look cloudy. Advanced Oxidation Processes can produce "micro-flocculation," a process of aggregating tiny particles that can then be removed by a pool filter from the water.

With lower chemical levels in your pool, AOP-treated water causes less irritation to eyes, skin, and lungs, making swimming and pool play safer and more enjoyable for everyone. Further, AOPs are an eco-friendly technology. Swimming pool water is effectively disinfected without any damage to the environment.

Perox Perfect™ and Perox pH Control™ are two auxiliary chemicals that complement the use of Perox sanitisers in Hydroxypure™ system. These chemicals, when used in harmony in Hydroxypure™ system, guarantee a truly comfortable and chlorine-free swimming experience.

The Perox Perfect™ has flocculating effects to clump floating microscopic particles such as algae spores and microscopic debris. These clumps known as floc, will then be filtered off by mechanical means in the filter tank. The Perox pH Control™ is the solution to regulate acidity or alkalinity of pool water. Perox pH Control™ contains formulated additives to ensure pH balance of pool water for enhanced clarity. It also works in synergy with $H_2O_2$ from the Hydroxypure system to maintain sanitary conditions in the swimming pool water. Perox pH Control™ is a multifunction chemical that is new for the swimming pool industry. Perox pH Control™ is specifically designed to work with electronic control equipment, and will not omit corrosive fumes that can lead to corrosion, extend the life of the peristaltic pump squeeze tubes and will enhance the water quality of the pool. It also enhances the ability of hydrogen peroxide to remain extremely active in the swimming pool water ensuring effective oxidation rates. Unlike other forms of acid for swimming pools, pH control will work in harmony with Hydrogen Peroxide and needs no dilution to use with the Hydroxypure™ system.

Based on a current consumer guide, 150 mls of Perox pH Control™ can reduce the pH by about 0.1 in a 50,000 litre swimming pool. This only applies in the range of pH 7 to 8. If the pH is in the range of 8 to 9, more acid will be required to reduce the pH by 0.1. A maximum dosage rate of 500 mls is recommended to achieve a reduction in pH from 7.8 to 7.4 in a pool containing 50,000 litres. It is not recommended to add any more than 500 mls per dose without checking the pH, to reduce overcorrection. It can take 4 to 6 hours for the chemical to fully react in the water.

In comparison, the following levels of individual product components are generally recommended:
 Sodium bisulphate: 680 g in pH is above 8.0 for pools of 40,000 L to 70,000 L
 To lower the alkalinity: 240 g per every 10,000 L of pool water
 Aluminium sulphate: up to 250 g/10,000 L of pool water at this level will act as flocculant rather than a clarifier
 Copper in a solution of 32 g/L of copper present as ethanolamine complex salts at a rate of 415 mL/10,000 L of pool water every 3 months to prevent algal growth.

Field Trial Example

A commercial example of the composition of the invention, Perox pH Control™ was tested on an Olympic size pool located at Somerset College on the Gold Coast, Brisbane, Australia.

The pH control method that was used at this site was a combination of hydrochloric acid and $CO_2$. The reason why both forms of pH control were being used was the constant interruption to the $CO_2$ supply—with the supplier often not able to supply replacement cylinders in a timely fashion. When $CO_2$ was not available, hydrochloric acid was used.

The other challenges noted at this site were as follows:
1) A high phosphate level was tested in the water (3.2 ppm)
2) Algae growth on the walls and floor of the pool were a common occurrence resulting in manual brushing of the entire pool at least twice per week.
3) Water clarity was not always 100% due to the aging filtration system. The filtration system has been installed for almost 20 years without a change of the internal media within the filter so there is a compromise on the filtration capacity of the system.

From a commercial point of view, the cost to use the Perox pH Control™ must be within a reasonable cost when compared to the alternatives.

Results after 6 Months:
1) The phosphate level in the pool was recorded at 0.35 ppm—down from 3.2 ppm
2) The algae growth on the walls and floor was completely eliminated and thus the need to brush the walls and floors was eliminated. A moderate level of 0.25 ppm of total copper was recorded in the pool when tested.
3) The water clarity of the pool remained excellent throughout the trial period—a noted improvement overall during the trial
4) An unexpected result was a reduction in the chlorine consumption—on average a saving of approximately 25% in chlorine consumption was reported by the operator at the site.
5) The cost to operate this form of pH control was only slightly higher (approximately 6%) than the other forms of pH Control. When the chlorine saving factor and the labour-saving factor was added back into the costs the overall result was a saving.
6) The operators at the site have continued to use Perox pH Control™ now that the trial has been completed.

Although the invention has been described with reference to specific examples, it will be appreciated by those skilled in the art that the invention may be embodied in many other forms, in keeping with the broad principles and the spirit of the invention described herein.

The present invention and the described preferred embodiments specifically include at least one feature that is industrially applicable.

I claim:

1. An aqueous composition for treating swimming pool water, comprising:
   water;
   sodium bisulphate in an amount of from 30% to 40% by weight; and
   aluminium sulphate in an amount of from 0.2% to 5% by weight based on a total weight of the aqueous composition.

2. The aqueous composition of claim 1, wherein a weight ratio of the aluminium sulphate to the sodium bisulphate is between 1/10 and 1/500.

3. The aqueous composition of claim 1, wherein a weight ratio of the aluminium sulphate to the sodium bisulphate is between 1/20 and 1/100.

4. The aqueous composition of claim 1, wherein a weight ratio of the aluminium sulphate to the sodium bisulphate is between 1/90 and 1/100.

5. The aqueous composition of claim 1, further comprising copper sulphate.

6. The aqueous composition of claim 5, wherein a weight ratio of the copper sulphate to the sodium bisulphate is between 1/200 and 1/500.

7. The aqueous composition of claim 1, further comprising a chelating agent and copper sulphate.

8. The aqueous composition of claim 7, wherein a weight ratio of the chelating agent and the copper sulphate to the sodium bisulphate is between 1/200 and 1/500.

9. The aqueous composition of claim 1, further comprising sodium hydroxide.

10. The aqueous composition of claim 9, wherein the sodium hydroxide is present in an amount of from 0.01% to 0.02% by weight based on the total weight of the aqueous composition.

11. The aqueous composition of claim 1, further comprising copper sulphate and sodium hydroxide.

12. An aqueous pH control solution, comprising:
    sodium bisulphate ($NaHSO_4$) in an amount of from 30% to 40% by weight;
    aluminium sulphate $Al_2(SO_4)_3$ in an amount of from 0.2% to 5% by weight;
    copper sulphate and chelating agent in an amount of from 0.1% to 1% by weight;
    sodium hydroxide in an amount of from 0.01% to 0.02% by weight; and
    water, all based on a total weight of the aqueous composition.

13. A composition for treating swimming pool water or spa water, wherein the composition is free of chlorine and comprises the aqueous pH control solution of claim 12.

14. The composition of claim 13, further comprising hydrogen peroxide.

15. A composition for treating swimming pool water or spa water, wherein the composition comprises an aqueous pH control solution and is free of chlorine, the pH control solution comprising:
    water;
    sodium bisulphate in an amount of from 30% to 40% by weight; and
    aluminium sulphate in an amount of from 0.2% to 5% by weight based on a total weight of the pH control solution.

16. The composition of claim 15, further comprising hydrogen peroxide.

17. The composition of claim 15, wherein the aqueous pH control solution further comprises copper sulphate.

18. The composition of claim 17, wherein the aqueous pH control solution has a weight ratio of the copper sulphate to the sodium bisulphate in a range of between 1/200 and 1/500.

19. The composition of claim 15, wherein the aqueous pH control solution further comprises copper sulphate and a chelating agent.

20. The composition of claim 19, wherein an amount of the copper sulphate and the chelating agent in the aqueous pH control solution is from 0.1% to 1% by weight based on the total weight of the pH control solution.

* * * * *